(12) United States Patent
Shen et al.

(10) Patent No.: US 11,086,410 B2
(45) Date of Patent: Aug. 10, 2021

(54) APPARATUS FOR TEXT ENTRY AND ASSOCIATED METHODS

(71) Applicant: Nokia Technologies Oy, Espoo (FI)

(72) Inventors: Hongrui Shen, Beijing (CN); Bing Lin, Beijing (CN); Jing Wu, Beijing (CN); Naichen Cui, Beijing (CN); Bin Gao, Beijing (CN); Zhuoyuan Liao, Beijing (CN)

(73) Assignee: Nokia Technologies Oy, Espoo (FI)

( * ) Notice: Subject to any disclaimer, the term of this patent is extended or adjusted under 35 U.S.C. 154(b) by 1394 days.

(21) Appl. No.: 14/655,278

(22) PCT Filed: Dec. 24, 2012

(86) PCT No.: PCT/CN2012/087340
§ 371 (c)(1),
(2) Date: Jun. 24, 2015

(87) PCT Pub. No.: WO2014/100955
PCT Pub. Date: Jul. 3, 2014

(65) Prior Publication Data
US 2015/0331606 A1 Nov. 19, 2015

(51) Int. Cl.
*G06F 3/023* (2006.01)
*G06F 3/0481* (2013.01)
*G06F 3/0488* (2013.01)
*G06F 16/338* (2019.01)

(52) U.S. Cl.
CPC .......... *G06F 3/0237* (2013.01); *G06F 3/0481* (2013.01); *G06F 3/04883* (2013.01); *G06F 3/04886* (2013.01); *G06F 16/338* (2019.01)

(58) Field of Classification Search
CPC ... G06F 3/0237; G06F 3/0481; G06F 3/04886
See application file for complete search history.

(56) References Cited

U.S. PATENT DOCUMENTS

| 8,838,562 B1* | 9/2014 | Boyen .................. G06F 3/0481 707/706 |
| 2007/0233463 A1 | 10/2007 | Sparre |
| 2008/0009300 A1 | 1/2008 | Vuong |
| 2009/0198691 A1 | 8/2009 | Kraft et al. |

(Continued)

OTHER PUBLICATIONS

International Search Report for International Application No. PCT/CN2012/087340—Date of Completion of Search: Sep. 15, 2013, 3 pages.

(Continued)

*Primary Examiner* — Ryan Barrett
(74) *Attorney, Agent, or Firm* — Locke Lord LLP

(57) ABSTRACT

An apparatus comprising: at least one processor; and at least one memory including computer program code, the at least one memory and the computer program code configured, with the at least one processor, to cause the apparatus to perform at least the following: based on an entered text string, enable selection of at least a part of a presented full text string as an adaptation for the entered text string by a user interaction with the presented full text string itself, the presented full text string being presented to the user prior to initiation of entry of the entered text string.

14 Claims, 5 Drawing Sheets

(56) References Cited

U.S. PATENT DOCUMENTS

| | | | |
|---|---|---|---|
| 2010/0166309 A1* | 7/2010 | Hull | G06F 17/30247 |
| | | | 382/176 |
| 2010/0245261 A1 | 9/2010 | Karlsson | |
| 2011/0289406 A1* | 11/2011 | Wassingbo | G06F 3/0488 |
| | | | 715/256 |
| 2012/0084075 A1 | 4/2012 | Yamada et al. | |
| 2014/0164981 A1* | 6/2014 | Colley | G06F 3/04886 |
| | | | 715/780 |
| 2015/0074578 A1* | 3/2015 | Liang | G06F 3/0488 |
| | | | 715/770 |

OTHER PUBLICATIONS

PCT Written Opinion of the International Searching Authority for International Application No. PCT/CN2012/087340—Date of Completion of Opinion: Sep. 16, 2013, 3 pages.

* cited by examiner

Figure 6a
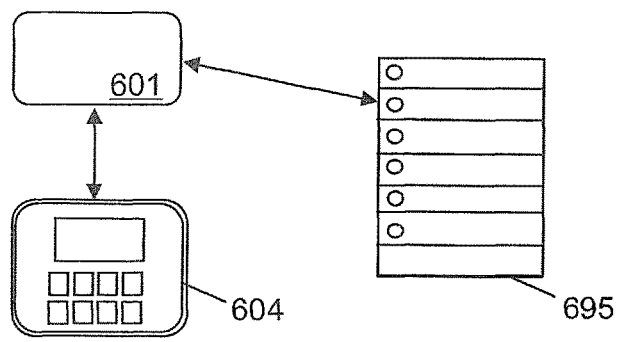
Figure 6b
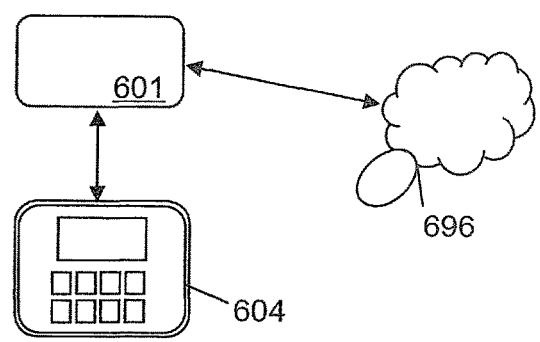
Figure 7
781 — based on an entered text string, enable selection of at least a part of a presented full text string as an adaptation for the entered text string by a user interaction with the presented full text string itself, the presented full text string being presented to the user prior to initiation of entry of the entered text string.
Figure 8
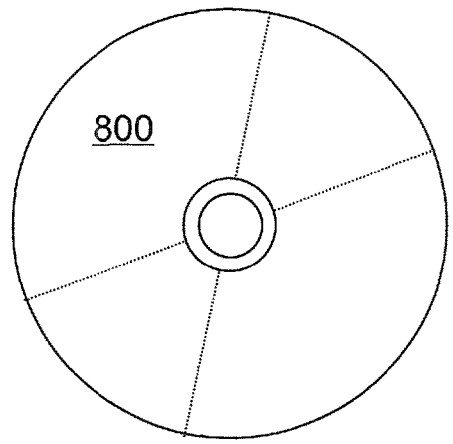

APPARATUS FOR TEXT ENTRY AND ASSOCIATED METHODS

TECHNICAL FIELD

The present disclosure relates to the field of text entry, associated methods and apparatus. Certain disclosed example aspects/embodiments relate to portable electronic devices, which may include so-called hand-portable electronic devices which may be hand-held in use (although they may be placed in a cradle in use). Such hand-portable electronic devices may include mobile telephones, so-called Personal Digital Assistants (PDAs) and tablet PCs.

Portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

It is common for electronic devices to provide a user interface (e.g. a graphical user interface). A user interface may enable a user to interact with an electronic device, for example, to open applications using application icons, enter commands, to select menu items from a menu, or to enter characters using a virtual keypad. To enter text strings, the user may be provided with a physical or virtual keyboard.

The listing or discussion of a prior-published document or any background in this specification should not necessarily be taken as an acknowledgement that the document or background is part of the state of the art or is common general knowledge. One or more example aspects/embodiments of the present disclosure may or may not address one or more of the background issues.

SUMMARY

According to a first example embodiment, there is provided an apparatus comprising:
  at least one processor; and
  at least one memory including computer program code,
  the at least one memory and the computer program code configured, with the at least one processor, to cause the apparatus to perform at least the following:
  based on an entered text string, enable selection of at least a part of a presented full text string as an adaptation for the entered text string by a user interaction with the presented full text string itself, the presented full text string being presented to the user prior to initiation of entry of the entered text string.

The text string may be entered by the user into a text field (e.g. using a keyboard or keypad). Such text entry may be performed by a user selecting a series of one or more user interface elements (e.g. keys and/or predictive text candidate icons).

A text string may comprise a series of one or more characters in a particular order. A character may comprise a combination of one or more of a word, a letter character (e.g. from the Roman, Greek, Arabic or Cyrillic alphabets), a numeric character a graphic character (e.g. a sinograph, Japanese kana or Korean delineation), a phrase, a syllable, a mathematical symbol, a diacritical mark, an emoticon, and a punctuation mark. A text string may comprise a combination of one or more of: a word; a sentence; a phrase; an affix; a prefix and a suffix. A text string may include a series of letters/characters which can be used to transcribe, for example, Chinese (e.g. Pinyin, Zhuyin Fuhao). That is, the apparatus may be configured to enable input of Chinese or Japanese characters, either directly or via transcription methods such as Pinyin and/or Zhuyin Fuhao.

A text string may be recognised by the apparatus/electronic device using one or more delimiters (e.g. non-alphanumeric characters, spaces, punctuation marks, capital letters, tab character, return character, or another control character), the delimiters being associated with the beginning and/or end of the text string. The enabling of selection of at least a part of a presented full text string may be based on the most recently entered text string (e.g. the last entered word/partial word; last entered sentence/partial sentence; last entered pinyin syllable/partial syllable). The selection of at least a part of a presented full text string may be based on the whole entered text string.

The entered text string may form part of, for example, a text message, an SMS message, an MMS message, an email, a search entry, a text document, a phone number, a twitter post, a status update, a blog post, a calendar entry and a web address.

A keyboard or keypad for text entry may comprise, for example, an alphanumeric key input area, alphabetic key input area, a numeric key input area, an AZERTY key input area, a QWERTY key input area or an ITU-T E.161 key input area.

The presented full text string may be a full text string which has been previously input in an open application by the user; and/or is available for view in an open application by the user during entry of the entered text string (e.g. text presented as part of a webpage being viewed by the user).

The apparatus may be configured to highlight the presented full text string as a candidate to allow for selection of the presented full text string (e.g. based on a comparison of the entered text string with potential presented full text string candidates). Highlighting may comprise indicating to the user which characters are highlighted (e.g. by changing the colour of the characters, or providing an indicator). Highlighting a text string may comprise distinguishing the characters of the highlighted text string with respect to other characters (e.g. by making the highlighted characters a different colour to at least one other non-highlighted character). Highlighting may or may not comprise providing one or more of an audio indication (e.g. a beep, or a message announcing the highlighted item), a visual indication and a tactile (e.g. haptic feedback) indication.

The apparatus may be configured to enable the selection of the presented full text string by interaction with the highlighted presented full text string. For example, a user may select a highlighted presented full text string by providing an input within/associated with the area of the highlighted presented full text string (e.g. with a stylus on a touch screen or using a cursor controlled by an external user interface element such as a mouse or touchpad)

The full text string may be presented to the user within an open application the open application being one of:
  a separate application to the application being used to enter the text string; or
  the same application being used to enter the text string.

An application may comprise one or more of an e-mail application, a contact list, an address book, a messaging application, a calendar, a microblogging application, a social networking application, a music application, a navigating application, a dictionary application, and an e-book application.

The apparatus may be configured to enable selection of at least part of a presented full text string, the at least part of the selectable presented full text string comprising a text string which is the same as the entered text string.

The apparatus may be configured to enable selection by a user interaction with the full text string itself by using a comparison (which may be done by itself or another apparatus) of the entered text string with at least a part of the full text string, the full text string available in a temporary buffer store automatically populated with presented full text strings.

The temporary buffer store may be a temporary prediction dictionary which is automatically populated with presented full text strings from an open application and which is deleted when the open application is closed.

The temporary buffer store may be a temporary prediction dictionary which is automatically updated:
  to include new full text strings when new full text strings are presented; and
  to remove full text strings as the corresponding presented full text strings are no longer presented.

The apparatus may be configured to enable selection by a user interaction with the full text string itself by using a comparison (which may be done by itself or another apparatus) of the entered text string with a portion of the full text string, the full text string available in a prediction dictionary automatically populated with presented full text strings.

The apparatus may comprise a graphical user interface configured to provide the entered text string and/or presented full text string as display outputs.

The apparatus may be a portable electronic device, a laptop computer, a mobile phone, a Smartphone, a tablet computer, a personal digital assistant, a digital camera, a watch, a server, a non-portable electronic device, a desktop computer, a monitor, a server, a wand, a pointing stick, a touchpad, a touch-screen, a mouse, a joystick or a module/circuitry for one or more of the same.

According to a further example embodiment, there is provided a method, the method comprising:
  based on an entered text string, enable selection of at least a part of a presented full text string as an adaptation for the entered text string by a user interaction with the presented full text string itself, the presented full text string being presented to the user prior to initiation of entry of the entered text string.

According to a further example embodiment, there is provided a computer program comprising computer program code, the computer program code being configured to perform at least the following:
  based on an entered text string, enable selection of at least a part of a presented full text string as an adaptation for the entered text string by a user interaction with the presented full text string itself, the presented full text string being presented to the user prior to initiation of entry of the entered text string.

According to a further example embodiment there is provided an apparatus, the apparatus comprising:
  an enabler configured to enable, based on an entered text string, selection of at least a part of a presented full text string as an adaptation for the entered text string by a user interaction with the presented full text string itself, the presented full text string being presented to the user prior to initiation of entry of the entered text string.

According to a further example embodiment there is provided an apparatus, the apparatus comprising:
  a means for enabling configured to enable, based on an entered text string, selection of at least a part of a presented full text string as an adaptation for the entered text string by a user interaction with the presented full text string itself, the presented full text string being presented to the user prior to initiation of entry of the entered text string.

The steps of any method disclosed herein do not have to be performed in the exact order disclosed, unless explicitly stated or understood by the skilled person.

Corresponding computer programs (which may or may not be recorded on a carrier, such as a CD or other non-transitory medium) for implementing one or more of the methods disclosed herein are also within the present disclosure and encompassed by one or more of the described example embodiments.

The present disclosure includes one or more corresponding example embodiments, example embodiments or features in isolation or in various combinations whether or not specifically stated (including claimed) in that combination or in isolation. Corresponding means and corresponding function units (e.g. a enabler, a selector) for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIGS. 6a-6b illustrate an example apparatus in communication with a remote server/cloud;

FIG. 7 shows the main steps of an example method of enabling selection of presented full text strings; and FIG. 8 shows an example of a computer-readable medium comprising a computer program.

DESCRIPTION OF SPECIFIC EXAMPLE EMBODIMENTS

Figure 1:
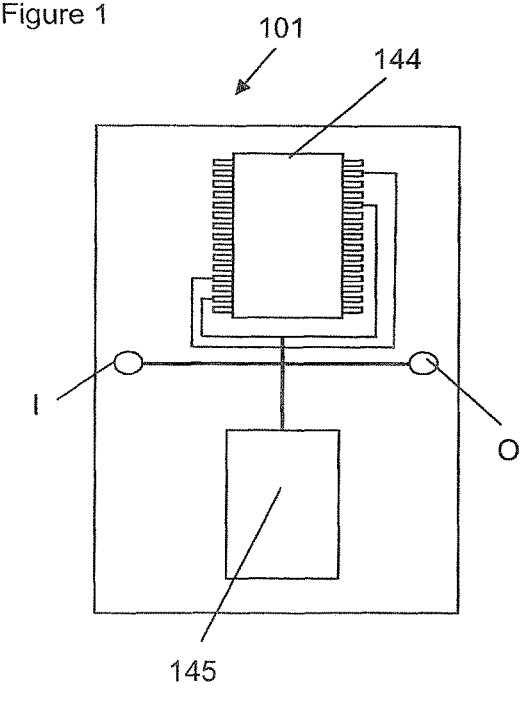
FIG. 1 depicts an example apparatus comprising a number of electronic components, including memory and a processor.

It is common for an electronic device to have a user interface (which may or may not be graphically based) to allow a user to interact with the device to enter and/or interact with information. For example, the user may use a keyboard user interface to enter text, or icons to open applications.

For small devices in particular, there are competing factors in providing as many user interface elements as possible (e.g. to increase the functionality available to the user), and ensuring that the overall size of the user interface element array does not take up too much space.

Taking character entry as an example, graphical user interfaces may provide a keyboard configured to enable a user to enter characters into a separate text entry field. In addition, predictive text candidates may be displayed/presented. Each of these components occupies space which may result in a cluttered user interface. Also full text strings (in that they are being presented prior to initiation of entry of the entered text string), which may likely be the subject of text entry, may be conveniently used.

The present disclosure relates to enabling, based on an entered text string, selection of at least a part of a presented full text string as an adaptation for the entered text string by a user interaction with the presented full text string itself, the presented full text string being presented to the user prior to initiation of entry of the entered text string. This may result in a less cluttered and a more intuitive user interface. That is, because the user may select predictive text candidates from the text already displayed, a separate portion of the screen need not be devoted to presenting predictive text candidates.

Furthermore, example embodiments may allow the user to access unusual words which are being presented on a screen but which are not present in a predictive text dictionary as predictive text candidates. This may allow context specific words to be accessible to the user without requiring the context specific words to be present in, and/or added to, a predictive text dictionary. For example, if a user were browsing a website and saw a word they didn't recognise, they could enter the word into the search engine whilst the word was being presented by entering one or more characters of the word as a text string and then selecting the word when the apparatus/device had enabled its selection based on the entered text string.

Other example embodiments depicted in the figures have been provided with reference numerals that correspond to similar features of earlier described example embodiments. For example, feature number 1 can also correspond to numbers 101, 201, 301 etc. These numbered features may appear in the figures but may not have been directly referred to within the description of these particular example embodiments. These have still been provided in the figures to aid understanding of the further example embodiments, particularly in relation to the features of similar earlier described example embodiments.

FIG. 1 shows an apparatus 101 comprising memory 145, a processor 144, input I and output O. In this example embodiment only one processor and one memory are shown but it will be appreciated that other example embodiments may utilise more than one processor and/or more than one memory (e.g. same or different processor/memory types).

In this example embodiment the apparatus 101 is an Application Specific Integrated Circuit (ASIC) for a portable electronic device. In other example embodiments the apparatus 101 can be a module for such a device, or may be the device itself, wherein the processor 144 is a general purpose CPU of the device and the memory 145 is general purpose memory comprised by the device.

The input I allows for receipt of signalling to the apparatus 101 from further components (e.g. from a receiver), such as components of a portable electronic device (like a touch-sensitive display) or the like. The output O allows for onward provision of signalling from within the apparatus 101 to further components. In this example embodiment the input I and output O are part of a connection bus that allows for connection of the apparatus 101 to further components (e.g. to a transmitter or a display).

The processor 144 is a general purpose processor dedicated to executing/processing information received via the input I in accordance with instructions stored in the form of computer program code on the memory 145. The output signalling generated by such operations from the processor 144 is provided onwards to further components via the output O.

The memory 145 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 144, when the program code is run on the processor 144. The internal connections between the memory 145 and the processor 144 can be understood to provide, in one or more example embodiments, an active coupling between the processor 144 and the memory 145 to allow the processor 144 to access the computer program code stored on the memory 145.

In this example the input I, output O, processor 144 and memory 145 are all electrically connected to one another internally to allow for electrical communication between the respective components I, O, 144, 145. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
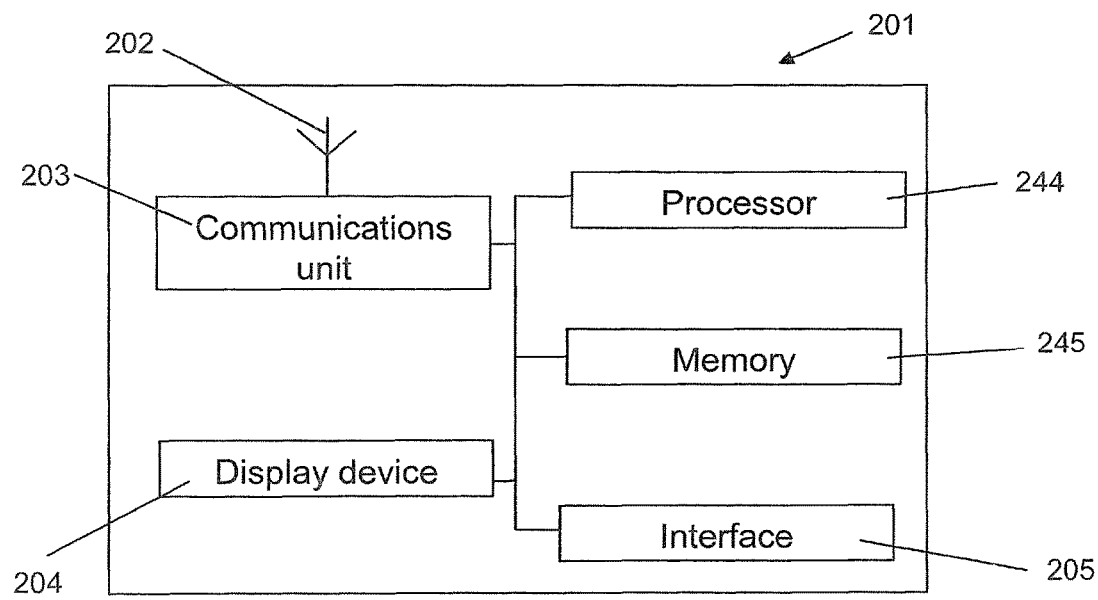
FIG. 2 depicts an example apparatus comprising a number of electronic components, including memory, a processor and a communication unit.

FIG. 2 depicts an apparatus 201 of a further example embodiment, such as a mobile phone. In other example embodiments, the apparatus 201 may comprise a module for a mobile phone (or PDA or audio/video player), and may just comprise a suitably configured memory 245 and processor 244. The apparatus in certain example embodiments could be a portable electronic device, a laptop computer, a mobile phone, a Smartphone, a tablet computer, a personal digital assistant, a digital camera, a watch, a server, a non-portable electronic device, a desktop computer, a monitor, a server, a wand, a pointing stick, a touchpad, a touchscreen, a mouse, a joystick or a module/circuitry for one or more of the same.

The example embodiment of FIG. 2, in this case, comprises a display device 204 such as, for example, a Liquid Crystal Display (LCD) or touch-screen user interface. The apparatus 201 of FIG. 2 is configured such that it may receive, include, and/or otherwise access data. For example, this example embodiment 201 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example embodiment comprises a memory 245 that stores data, possibly after being received via antenna 202 or port or after being generated at the user interface 205. The processor 244 may receive data from the user interface 205, from the memory 245, or from the communication unit 203. It will be appreciated that, in certain example embodiments, the display device 204 may incorporate the user interface 205. Regardless of the origin of the data, these data may be outputted to a user of apparatus 201 via the display device 204, and/or any other output devices provided with apparatus. The processor 244 may also store the data for later use in the memory 245. The memory 245 may store computer program code and/or applications which may be used to instruct/enable the processor 244 to perform functions (e.g. read, write, delete, edit or process data).

Figure 3:
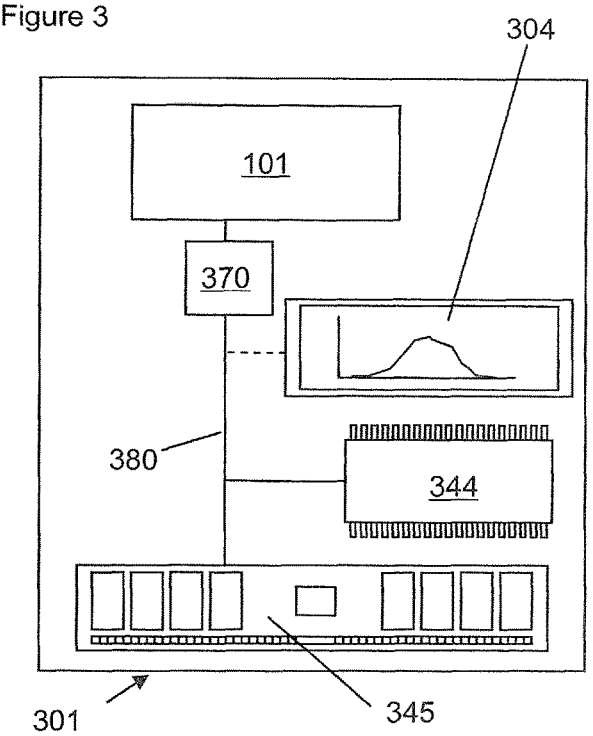
FIG. 3 depicts an example apparatus comprising a number of electronic components, including memory, a processor and a communication unit.

FIG. 3 depicts a further example embodiment of an electronic device 301, such as a tablet personal computer, a portable electronic device, a portable telecommunications device, a server or a module for such a device, the device comprising the apparatus 101 of FIG. 1. The apparatus 101 can be provided as a module for device 301, or even as a processor/memory for the device 301 or a processor/memory for a module for such a device 301. The device 301 comprises a processor 344 and a storage medium 345, which are connected (e.g. electrically and/or wirelessly) by a data bus 380. This data bus 380 can provide an active coupling between the processor 344 and the storage medium 345 to allow the processor 344 to access the computer program code. It will be appreciated that the components (e.g. memory, processor) of the device/apparatus may be linked via cloud computing architecture. For example, the storage device may be a remote server accessed via the internet by the processor.

The apparatus 101 in FIG. 3 is connected (e.g. electrically and/or wirelessly) to an input/output interface 370 that receives the output from the apparatus 101 and transmits this to the device 301 via data bus 380. Interface 370 can be connected via the data bus 380 to a display 304 (touch-sensitive or otherwise) that provides information from the apparatus 101 to a user. Display 304 can be part of the device 301 or can be separate. The device 301 also comprises a processor 344 configured for general control of the apparatus 101 as well as the device 301 by providing signalling to, and receiving signalling from, other device components to manage their operation.

The storage medium 345 is configured to store computer code configured to perform, control or enable the operation of the apparatus 101. The storage medium 345 may be configured to store settings for the other device components. The processor 344 may access the storage medium 345 to retrieve the component settings in order to manage the operation of the other device components. The storage medium 345 may be a temporary storage medium such as a volatile random access memory. The storage medium 345 may also be a permanent storage medium such as a hard disk drive, a flash memory, a remote server (such as cloud storage) or a non-volatile random access memory. The storage medium 345 could be composed of different combinations of the same or different memory types.

FIGS. 4a-4d depicts an example embodiment of the apparatus depicted in FIG. 2 comprising a portable electronic communications device 401, e.g. such as a mobile phone, with a user interface comprising a touch-screen user interface 405, 404, a memory (not shown), a processor (not shown) and an antenna (not shown) for transmitting and/or receiving data (e.g. emails, textual messages, phone calls, information corresponding to web pages). In this case, the apparatus is configured to enable, based on an entered text string, selection of at least a part of a presented full text string as an adaptation for the entered text string by a user interaction with the presented full text string itself, the presented full text string being presented to the user prior to initiation of entry of the entered text string.

Figure 4A:
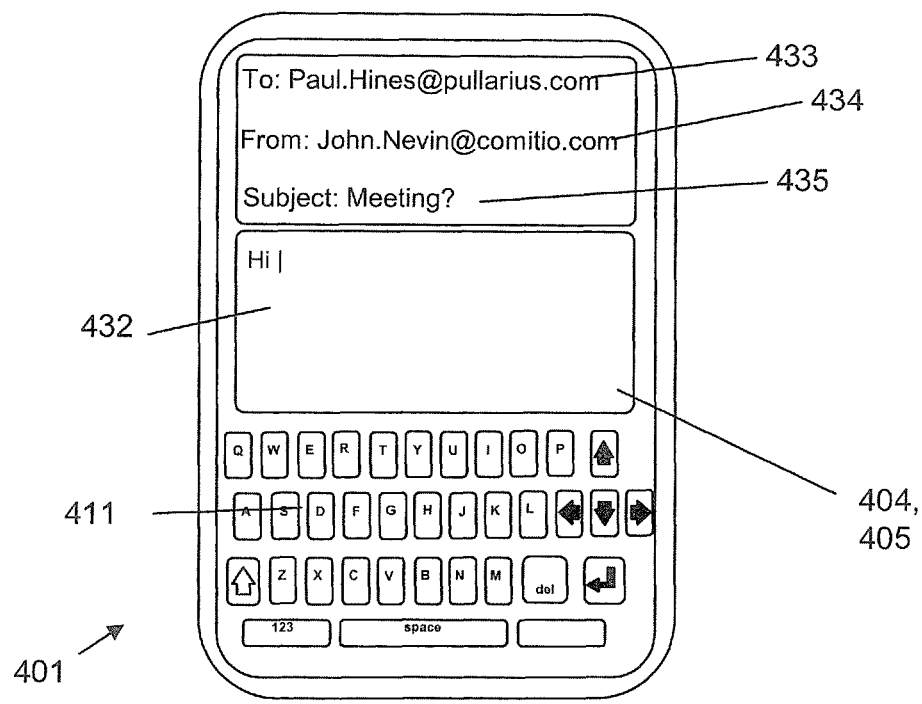
FIGS. 4a-4d illustrate an example apparatus.

In the situation depicted in FIG. 4a, the device/apparatus is displaying an email application screen corresponding to an email application. The email application screen comprises a virtual keyboard 411, which in this case is a standard virtual keyboard comprising letter keys (of the Roman alphabet) arranged according to a QWERTY layout; and an email region. The email region is configured to display: a recipient field 433 configured to list the email addresses of the recipients; a sender field 434 configured to list the email address of the sender; a subject field 435 configured to allow the user to enter a brief title for the email; and a message field 432, configured to allow the user to enter the body text of the email.

It will be appreciated that other example embodiments may be configured to provide other keyboard layouts. For example, a keyboard or keypad may comprise an alphanumeric key input area, alphabetic key input area, a numeric key input area, an AZERTY key input area, a QWERTY key input area or an ITU-T E.161 key input area.

In this case, the user is composing an email to his colleague Paul Hinds to inquire about a meeting. In the situation depicted in FIG. 4a, the user has already entered Paul Hinds' email address into the recipient field 433, and a brief title for the email into the subject field 435. The apparatus/device is configured to enter the user's email address automatically into the sender field 434 (That is, in this embodiment, the senders email is not entered by the user). It will be appreciated that other example embodiments may allow the user to select the email address for the sender from, for example, a list of possible sender email address associated with the user.

In the situation depicted in FIG. 4a, the user is in the process of entering text into the message field 432. He wishes the complete message to be "Hi Paul, Could we meet up soon? Best wishes, John Nevin". In the situation depicted in FIG. 4a, the user has entered the first word of the message, 'Hi', and is going to continue entering text using the virtual keyboard 411 to enter the next word, Paul.

Figure 4B:
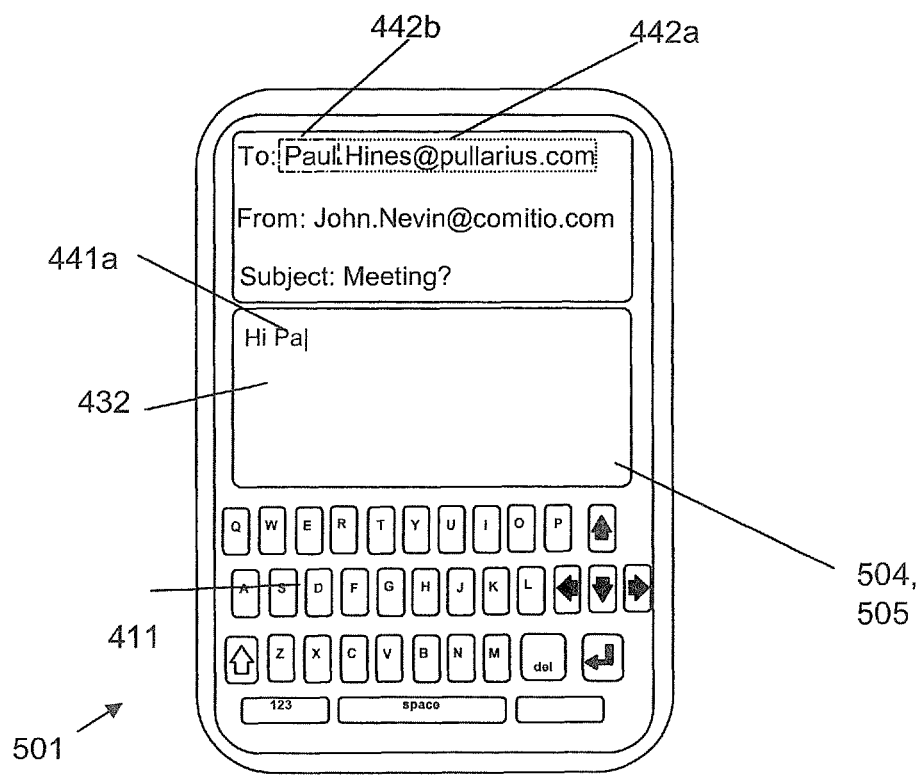

FIG. 4b depicts the mobile device as the user is in the process of entering the word 'Paul'. In particular, as shown in FIG. 4b, the user has entered the text string 'Pa' 441a which forms the first part of the complete word text string 'Paul'.

In this case, the apparatus/device is configured to, based on the entered text string 441a, enable selection of at least a part of a presented full text string as an adaptation for the entered text string (which in this case is 'Pa') by a user interaction with the presented full text string itself, the presented full text string being presented to the user prior to initiation of entry of the entered text string.

In this case, the apparatus is configured to compare the entered text string 441a with the presented full text strings being presented to the user prior to initiation of entry of the entered text string to determine whether at least a portion of the full presented text strings comprise characters corresponding to the entered text string. That is, in this case, those full or partial text strings which comprise characters corresponding to the entered text string may be considered as candidate text strings (e.g. they may be presented as candidates for selection by the user to alter the entered text string). In this case, the apparatus has determined that the email address full text string 'Paul.Hines@pullarius.com' 442a comprises the entered text string 'Pa' 441a, and so the apparatus/device is configured to denote it as a candidate text string.

The apparatus/device is, in this case, configured to recognise that the presented email address full text string comprises a number of possible candidate text strings (each of which is a part of the presented full text string) which are delimited by punctuation marks. That is, in this case, the apparatus is configured to recognise that the text strings 'Paul', 'Hines' and 'Pullarius' are possible candidate text strings as they are delimited by non-alphanumeric characters (i.e. in this case by full stop punctuation marks '.' and the at symbol '@'). In this case only the partial text string 'Paul' 441*b* comprises characters corresponding to the entered text string 'Pa' 441*a*.

Based on this determination, the apparatus is configured to highlight the presented text strings which comprise the entered text strings (i.e. the candidate text strings which, in this case, are the text strings 'Paul' and 'Paul.Hines@pullarius.com') by providing a border around them. This is shown in FIG. 4*b*. In this case, neither of the candidate strings form part of a predictive text dictionary. That is, in this case, the apparatus/device is configured to enable selection by a user interaction with the full text string itself by using a comparison of the entered text string with at least a part of the full text string, the full text string available in a temporary buffer store automatically populated with full text strings presented to the user.

In this case the user selects the candidate text string 'Paul' by providing an interaction input with a stylus (e.g. the user's finger) to the area of the touch screen within the highlighted border. In response to this user interaction the apparatus/device is configured to adapt the entered text string by replacing the entered text string with the selected candidate text string. It will be appreciated that other example embodiments may be configured to adapt the entered text string in other ways, for example, by appending any additional characters to the end of the entered text string (e.g. appending the additional characters 'ul' to the entered text string 'Pa' to generate the adapted string 'Paul').

Figure 4C:
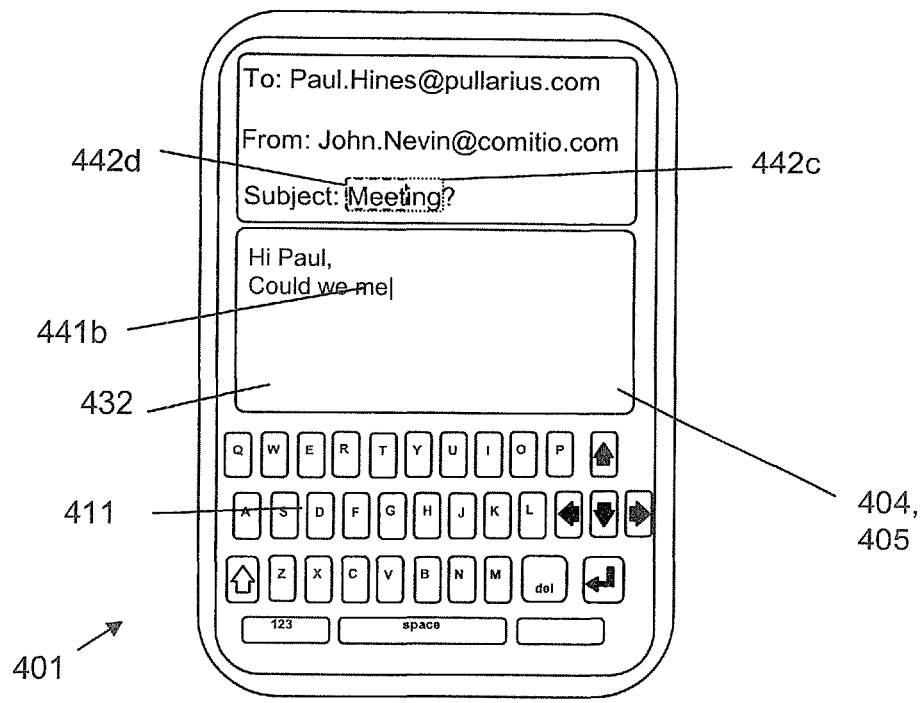
Figure 4D:
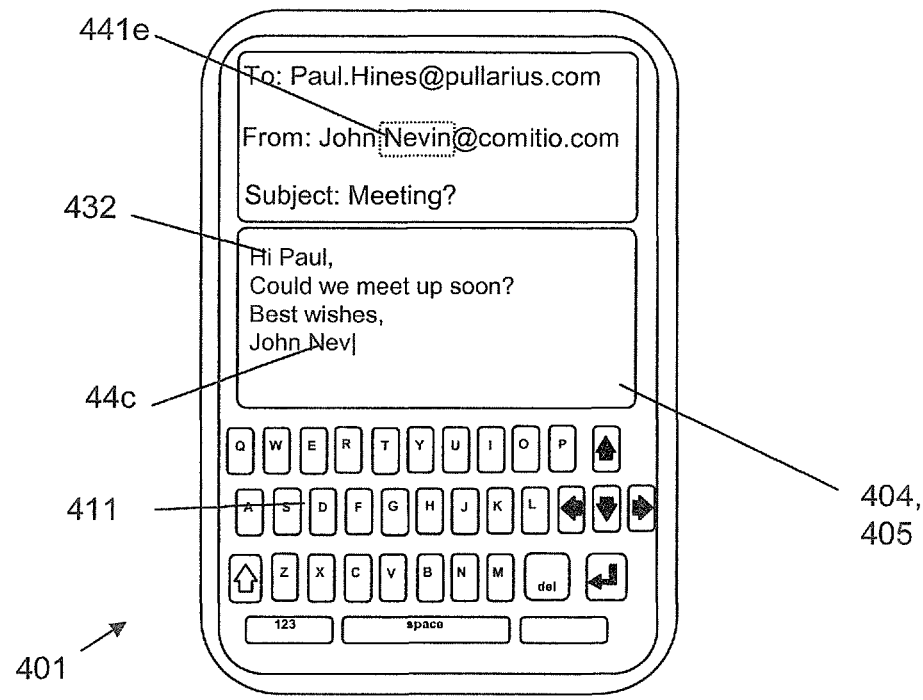

After the entered string has been entered, the user continues to enter characters by selecting character keys on the virtual keyboard. As shown in FIG. 4*c*, the user has entered the text string 'me' as part of the complete word 'meet'. As with the previous entered text string, the apparatus/device is configured to determine a list of one or more candidate text strings based on the entered text strings. In this case, the apparatus determines that the presented text string 'meeting' comprises the entered text string. In this example embodiment, the apparatus is also configured to consider, as possible candidate text strings, portions of presented full text strings which correspond to complete words in the predictive text dictionary. In this case, therefore, the device is configured to determine whether the text string 'meet' should be a candidate text string, because although 'meet' is not delimited by non-alphanumeric characters, the text string 'meet' corresponds to a complete text string in the predictive text dictionary. In this case 'meet' is determined to be a candidate text string as it comprises characters corresponding to the entered character string 441*b*.

In this, case the user selects the 'meet' candidate text string by providing an interaction input with a stylus (e.g. the user's finger) to the area of the touch screen within the highlighted border. In this case, because the 'meet' candidate text string border is completely within the 'meeting' candidate text string border, a user interaction within the 'meet' candidate text string border selects the 'meet' candidate text string, and a user interaction inside the 'meeting' candidate text string border but outside the 'meet' candidate text string selects the 'meeting' candidate text string. In response to this user interaction the apparatus/device is configured to adapt the entered text string by replacing the entered text string with the selected candidate text string.

After the entered string has been entered, the user continues to enter characters by selecting character keys on the virtual keyboard. As shown in FIG. 4*c*, the user is in the process of entering the text for the complete word 'Nevin'. That is, the user has entered the character string 'Nev'. As with the previous entered text strings, the apparatus/device is configured to determine a list of one or more candidate text strings based on the entered text strings. In this case, the apparatus determines that the presented text string 'Nevin' (which is part of the presented full character string John.Nevin@pullarius.com) comprises the entered text string.

In this case, the user selects the 'Nevin' candidate text string by providing an interaction input with a stylus (e.g. the user's finger) to the area of the touch screen within the highlighted border. In response to this user interaction the apparatus/device is configured to adapt the entered text string by replacing the entered text string with the selected candidate text string. In this way, the apparatus allows the user to use characters which were not originally or recently entered by him as candidate strings (i.e. the full character string was provided by the apparatus/device, not the user).

Figure 5A:
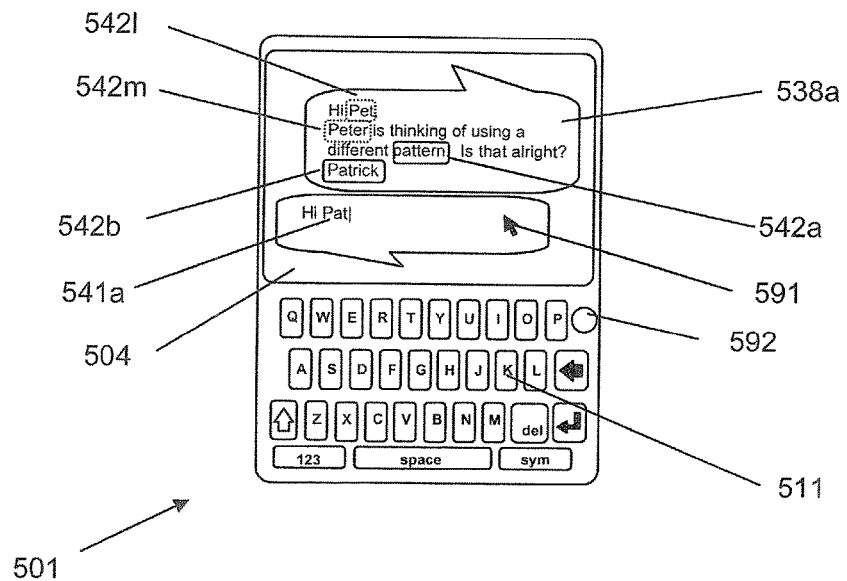
FIGS. 5a-5c show another example apparatus.
Figure 5B:
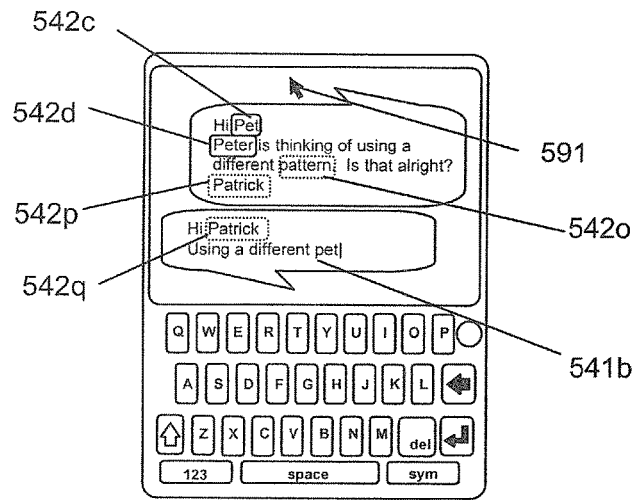
Figure 5C:
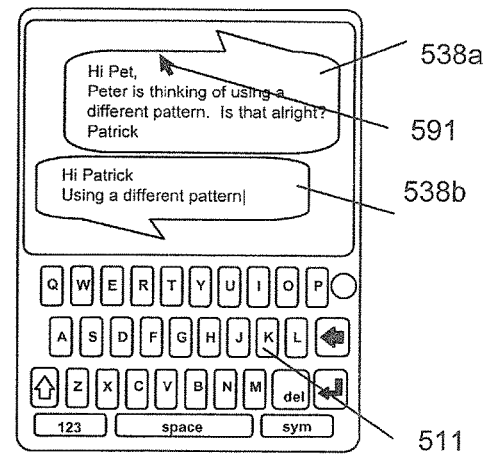

FIGS. 5*a*-5*c* depicts an example embodiment of the apparatus depicted in FIG. 2 comprising a portable electronic communications device 501, e.g. such as a personal digital assistant (PDA), with a user interface comprising a display screen 504, a physical keyboard 511, a pointing stick 592 for controlling a cursor 591, a memory (not shown), a processor (not shown) and an antenna (not shown) for transmitting and/or receiving data (e.g. emails, textual messages, phone calls, information corresponding to web pages). The physical keyboard 511 is a standard virtual keyboard comprising letter keys (of the Roman alphabet) arranged according to a QWERTY layout.

In the situation depicted in FIG. 5*a*, the device/apparatus is displaying a messaging application screen corresponding to a messaging application. The messaging application screen is configured to display: received messages 538, sent messages and messages being composed 538*b*.

FIG. 5*b* depicts the portable device as the user is in the process of entering the word text string 'Patrick'. In particular, as shown in FIG. 5*b*, the user has entered the text string 'Pat' 541*a* which forms the first part of the complete word text string 'Patrick'.

In this case, the apparatus/device is configured to, based on an entered text string, enable selection of at least a part of a presented full text string as an adaptation for the entered text string by a user interaction with the presented full text string itself, the presented full text string being presented to the user prior to initiation of entry of the entered text string.

In this case, the apparatus is configured to compare the entered text string 541*a* with the presented full text strings being presented to the user prior to initiation of entry of the entered text string to determine whether one or more of the entered text strings comprise the entered text string or are similar to the entered text string (e.g. to allow for spelling errors). In this case, the apparatus has determined that the word text strings 'Patrick' 542*b* and 'pattern' 542*a* each comprises the entered text string; and that the word text strings 'Pet' 542*l* and 'Peter' 542*m* comprise text strings which are similar to the entered text string.

Based on this determination, the apparatus is configured to highlight the presented text strings which comprise, or are similar to, the entered text strings (i.e. in this case the text strings 'Pet' 542*l*, 'Peter' 542*m*, 'pattern' 542*a* and 'Patrick' 542*b*) by providing a border around the candidate text strings. In this case, the apparatus/device is configured to distinguish candidate text strings 542*a*, 542*b* which comprise the entered text string from the candidate text strings 542*l*, 542*m* which comprise at least a portion which is similar to the entered text string by using different highlighting in each case. This is shown in FIG. 5*b*. That is, candidate text strings 542*a*, 542*b* which comprising the entered text string are highlighted using a solid border, whereas candidate text strings 542l, 542m which comprise at least a portion which is similar to the entered text string are highlighted using a dotted border.

In this case the user selects the candidate text string 'Patrick' 542b by providing an interaction input area corresponding to the desired candidate text string by positioning the cursor 591 (using the pointing stick 591) within the highlighted border and pressing a selection key. In response to this user interaction with the presented full text string comprising characters corresponding to the entered text string, the apparatus/device is configured to adapt the entered text string 541a by appending the additional character of the selected candidate text string to the entered text string (e.g. appending the additional characters 'rick' to the entered text string 'Pat' 541a to generate the text string 'Patrick'). It will be appreciated that other example embodiments may allow cursor control using different user interface elements (e.g. touchpad or mouse).

After the entered string has been entered, the user continues to enter characters by selecting character keys on the virtual keyboard. As shown in FIG. 5c, the user is in the process of entering the text for the complete word 'pattern'. In this case, the user has made a spelling error and inadvertently entered the text string 'pet' 541b.

As with the previous entered text string, the apparatus/device is configured to determine a list of one or more candidate text strings based on the entered text string 541b. In this case, the apparatus determines that the presented text strings 'Pet' 542c and 'Peter' 542d comprises the entered text string, and the presented text strings 'pattern' 542o and 'Patrick' 542p, 542q comprise a portion which is similar to the entered text string. As before, each of these text strings are highlighted according to whether they are a candidate text string 542c, 542d comprising the entered text string (highlighted with a solid border) or a candidate text string 542o, 542p, 542q comprising at least a portion which is similar to the entered text string (highlighted with a dotted border). In this case, the apparatus is configured to consider text strings entered by the user in the same text entry field as the entered text string as possible candidate characters. Therefore, in this case, the text string 'Patrick' 542q forming part of the message which the user is composing is highlighted as a candidate text string.

In this, case the user selects the 'pattern' 542o candidate text string by providing an interaction input by providing an interaction input area corresponding to the desired candidate text string by positioning the cursor 591 within the highlighted border and pressing a selection key. In response to this user interaction the apparatus/device is configured to adapt the entered text string by replacing the entered text string with the selected candidate text string. This is shown in FIG. 5c. The user can then continue entering text using the keyboard 511.

By enabling selection of text strings which comprise at least a portion which is similar to the entered text string, the user can use already presented full text strings to correct spelling errors when entering text. This may be useful when the user is entering text relating to an unusual word they have seen presented on the screen.

In the above examples, the presented full text strings were within an open application, the open application being the same application being used to enter the text string. It will be appreciated that other example embodiments may be configured to enable selection of at least part of a full text string presented within an open application, the open application being a separate application to the application being used to enter the text string. For example, the apparatus/device may be configured to allow a user to entering text into an email application using presented full text strings from a web browser application (e.g. presented in a separate window). In certain cases, the separate application (e.g. web browser) could be open but may be minimized/hidden and, for example, automatically no longer be minimized/hidden if a matching candidate is found. Rather than automatically no longer being minimized/hidden, the icon associated with the hidden/minimised separate application may be alerted to a user (e.g. by flashing/sound) to indicate the availability of possible availability of matching candidates.

It will be appreciated that other embodiments may allow the user to enter text into other applications in a similar way. For example the user may enter text into one or more of an e-mail application, a contact list, an address book, a messaging application, a calendar, a microblogging application, a social networking application, a music application, a navigating application, a dictionary application, and an e-book application. It will be appreciated that the entered text string may be entered into and/or form part of a text message, an SMS message, an MMS message, an email, a search entry, a text document, a phone number, a twitter post, a status update, a blog post, a calendar entry and a web address.

FIG. 6a shows that an example embodiment of an apparatus in communication with a remote server. FIG. 6b shows that an example embodiment of an apparatus in communication with a "cloud" for cloud computing. In FIGS. 6a and 6b, apparatus 601 (which may be apparatus 101, 201 or 301 is in communication with a display 604). Of course, the apparatus 601 and display 604 may form part of the same apparatus/device, although they may be separate as shown in the figures. The apparatus 601 is also in communication with a remote computing element. Such communication may be via a communications unit, for example. FIG. 6a shows the remote computing element to be a remote server 695, with which the apparatus may be in wired or wireless communication (e.g. via the internet, Bluetooth, a USB connection, or any other suitable connection as known to one skilled in the art). In FIG. 6b, the apparatus 601 is in communication with a remote cloud 696 (which may, for example, by the Internet, or a system of remote computers configured for cloud computing). It may be that the functions associated with the user interface elements are stored at the remote computing element 695, 696) and accessed by the apparatus 601 for display 604. The enabling selection and/or determining may be performed at the remote computing element 695, 696. The apparatus 601 may actually form part of the remote sever 695 or remote cloud 696.

FIG. 7 illustrates the process flow according to an example embodiment of the present disclosure. The process comprises enabling 781 based on an entered text string, selection of at least a part of a presented full text string as an adaptation for the entered text string by a user interaction with the presented full text string itself, the presented full text string being presented to the user prior to initiation of entry of the entered text string.

FIG. 8 illustrates schematically a computer/processor readable medium 800 providing a computer program according to one example embodiment. In this example, the computer/processor readable medium 800 is a disc such as a Digital Versatile iDsc (DVD) or a Compact Disc (CD). In other example embodiments, the computer/processor readable medium 800 may be any medium that has been programmed in such a way as to carry out an inventive function. The computer/processor readable medium 800 may be a removable memory device such as a memory stick or memory card (e.g. SD, mini SD or micro SD).

The computer program may comprise computer code configured to perform, control or enable one or more of the method steps 781 of FIG. 7. In this respect, the computer program may be stored on the storage medium of the scanning/initiating device, the storage medium of the advertising device or the storage media of both devices.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some example embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such example embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some example embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), Field-Programmable Gate Array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed example aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different example embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or example embodiment may be incorporated in any other disclosed or described or suggested form or example embodiment as a general matter of design choice.

Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus comprising:
   at least one processor; and
   at least one memory including computer program code,
   the at least one memory and the computer program code configured, with the at least one processor, to cause the apparatus to perform at least the following:
   based on an entered text string, enable selection of at least a part of a presented full text string as an adaptation for the entered text string by a user interaction with the presented full text string itself, the presented full text string being presented to the user prior to initiation of entry of the entered text string; and
   highlight the presented full text string as a candidate to allow for selection of the presented full text string.

2. The apparatus of claim 1, wherein the presented full text string is at least one of:
   a full text string which has been previously input in an open application by the user; and
   a full text string which is available for view by the user during entry of the entered text string in an open application.

3. The apparatus of claim 1, wherein the apparatus is configured to enable the selection of the presented full text string by interaction with the highlighted presented full text string.

4. The apparatus of claim 1, wherein the full text string is presented within an open application, the open application being:
- a separate application to the an application being used to enter the text string.

5. The apparatus of claim 1, wherein the apparatus is configured to enable selection by a user interaction with the full text string itself by using a comparison of the entered text string with at least a part of the full text string, the full text string available in a temporary buffer store automatically populated with full text strings presented to the user.

6. The apparatus of claim 5, wherein the temporary buffer store is a temporary prediction dictionary which is automatically populated with presented full text strings from an open application and which is deleted when the open application is closed.

7. The apparatus of claim 1, wherein the apparatus is configured to enable selection by a user interaction with the full text string itself by using a comparison of the entered text string with a portion of the full text string, the full text string available in a prediction dictionary automatically populated with presented full text strings.

8. The apparatus of claim 1, wherein the apparatus is configured to enable selection by a user interaction with the full text string itself by using a comparison of the entered text string with at least a part of the full text string, the full text string available in a temporary buffer store automatically populated with presented full text strings.

9. The apparatus of claim 1, wherein the apparatus is configured to enable selection of at least part of a presented full text string, the at least part of the selectable presented full text string comprising a text string which is the same as the entered text string.

10. The apparatus of claim 1, wherein the apparatus comprises a graphical user interface configured to provide the entered text string and/or presented full text string as display outputs.

11. The apparatus of claim 1, wherein the apparatus is a portable electronic device, a laptop computer, a mobile phone, a smartphone, a tablet computer, a personal digital assistant, a digital camera, a watch, a server, a non-portable electronic device, a desktop computer, a monitor, a server, a wand, a pointing stick, a touchpad, a touch-screen, a mouse, a joystick or a module/circuitry for one or more of the same.

12. The apparatus of claim 1, wherein the full text string is presented within an open application, the open application being an application that also is being used to enter the text string.

13. A method, the method comprising:
- based on an entered text string, enabling selection of at least a part of a presented full text string as an adaptation for the entered text string by a user interaction with the presented full text string itself, the presented full text string being presented to the user prior to initiation of entry of the entered text string; and
- highlighting the presented full text string as a candidate to allow for selection of the presented full text string.

14. A non-transitory computer readable medium comprising computer program code stored thereon for causing an apparatus to perform at least the following:
- based on an entered text string, enable selection of at least a part of a presented full text string as an adaptation for the entered text string by a user interaction with the presented full text string itself, the presented full text string being presented to the user prior to initiation of entry of the entered text string; and
- highlight the presented full text string as a candidate to allow for selection of the presented full text string.

* * * * *